(12) United States Patent
Aibara et al.

(10) Patent No.: US 8,918,056 B2
(45) Date of Patent: Dec. 23, 2014

(54) WIRELESS COMMUNICATION DEVICE AND WIRELESS COMMUNICATION METHOD FOR DETECTING FIELD INTENSITIES OF WIRELESS CHANNELS

(75) Inventors: Takehiro Aibara, Hamura (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP); Kimiyasu Mizuno, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 504 days.

(21) Appl. No.: 12/792,020

(22) Filed: Jun. 2, 2010

(65) Prior Publication Data

US 2010/0311348 A1 Dec. 9, 2010

(30) Foreign Application Priority Data

Jun. 3, 2009 (JP) ................................ 2009-133901

(51) Int. Cl.
*H04B 17/00* (2006.01)
*H04W 72/08* (2009.01)
*H04W 36/06* (2009.01)
*H04W 72/02* (2009.01)
*H04W 52/02* (2009.01)

(52) U.S. Cl.
CPC ......... *H04W 72/085* (2013.01); *H04B 17/0057* (2013.01); *H04W 36/06* (2013.01); *H04W 72/02* (2013.01); *H04W 52/0238* (2013.01)
USPC ....... 455/67.11; 455/62; 455/67.13; 455/63.3

(58) Field of Classification Search
USPC .............................. 455/67.11, 63.1, 62, 67.13
See application file for complete search history.

(56) References Cited

U.S. PATENT DOCUMENTS 5,203,008 A * 4/1993 Yasuda et al. .............. 455/452.2
5,404,573 A * 4/1995 Yabe et al. .................... 455/423
5,701,590 A * 12/1997 Fujinami ......................... 455/62

(Continued)

FOREIGN PATENT DOCUMENTS

EP 1819120 A1 8/2007
JP 10-327456 A 12/1998

(Continued)

OTHER PUBLICATIONS

Japanese Office Action dated Apr. 26, 2011 (and English translation thereof) in counterpart Japanese Application No. 2009-133901.

(Continued)

*Primary Examiner* — Nay A Maung
*Assistant Examiner* — Erica Fleming-Hall
(74) *Attorney, Agent, or Firm* — Holtz, Holtz, Goodman & Chick PC

(57) ABSTRACT

A wireless communication device includes a communication unit, a detection unit, and a control unit. The communication unit communicates with another wireless communication device by use of a wireless channel selected from wireless channels. The detection unit detects field intensities of first wireless channels. The control unit calculates a field intensity of a second wireless channel based on the field intensities of the first wireless channels, wherein the first wireless channels do not include the second wireless channel.

8 Claims, 13 Drawing Sheets

(56) References Cited

U.S. PATENT DOCUMENTS

| | | | |
|---|---|---|---|
| 5,732,327 A * | 3/1998 | Yoshimi et al. | 455/67.11 |
| 5,943,622 A * | 8/1999 | Yamashita | 455/509 |
| 6,122,493 A * | 9/2000 | Kobayashi et al. | 455/193.1 |
| 6,131,038 A * | 10/2000 | Sekine | 455/513 |
| 2002/0056066 A1* | 5/2002 | Gesbert et al. | 714/759 |
| 2003/0032441 A1* | 2/2003 | Ofuji et al. | 455/525 |
| 2004/0022205 A1* | 2/2004 | Miyata et al. | 370/319 |
| 2005/0054374 A1* | 3/2005 | Namiki | 455/550.1 |
| 2005/0107088 A1 | 5/2005 | Oura | |
| 2006/0035592 A1 | 2/2006 | Park | |
| 2006/0262840 A1* | 11/2006 | Wang et al. | 375/221 |
| 2006/0291401 A1 | 12/2006 | Yuen et al. | |
| 2007/0053332 A1* | 3/2007 | Kashiwagi et al. | 370/338 |
| 2007/0087701 A1* | 4/2007 | Kobayashi et al. | 455/101 |
| 2007/0297385 A1* | 12/2007 | Ishizu et al. | 370/342 |
| 2008/0101488 A1* | 5/2008 | Wilhelmsson et al. | 375/260 |
| 2008/0112386 A1* | 5/2008 | Ogawa et al. | 370/345 |
| 2009/0022132 A1* | 1/2009 | Adachi et al. | 370/338 |
| 2009/0022217 A1* | 1/2009 | Kimata | 375/232 |
| 2009/0079626 A1* | 3/2009 | Kobayashi | 342/357.12 |
| 2009/0291644 A1* | 11/2009 | Suwa et al. | 455/77 |
| 2010/0035569 A1* | 2/2010 | Aoyama | 455/226.4 |
| 2011/0235752 A1* | 9/2011 | Murakami et al. | 375/299 |
| 2011/0280146 A1* | 11/2011 | Tidestav et al. | 370/252 |

FOREIGN PATENT DOCUMENTS

| | | |
|---|---|---|
| JP | 10-336104 A | 12/1998 |
| JP | 2002-158667 A | 5/2002 |
| JP | 2003-151062 A | 5/2003 |
| JP | 2004-520766 A | 7/2004 |
| JP | 2005-20568 A | 1/2005 |
| JP | 2005-151433 A | 6/2005 |
| JP | 2007-311851 A | 11/2007 |
| JP | 2007-325064 A | 12/2007 |

OTHER PUBLICATIONS

Extended European Search Report dated May 28, 2014 in counterpart European Application No. 10164468.0.

* cited by examiner

FIG.8A

| CHANNEL NUMBER | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|
| FIELD INTENSITY | 53 | 66 | 66 | 78 | 61 | 61 | 44 | 57 | 57 | 69 | 51 | 51 | 32 | 45 | 45 | 58 |

FIG.8B

| CHANNEL NUMBER | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|
| FIELD INTENSITY | 53 | 78 | 78 | 78 | 78 | 78 | 44 | 69 | 69 | 69 | 69 | 69 | 32 | 58 | 58 | 58 |

FIG.8C

| CHANNEL NUMBER | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|
| FIELD INTENSITY | 53 | 61 | 70 | 78 | 67 | 55 | 44 | 52 | 61 | 69 | 57 | 44 | 32 | 41 | 49 | 58 |

FIG.14

| CHANNEL NUMBER \ n | 11 | 12 | 13 | 14 | 15 | 16 | 17 | 18 | 19 | 20 | 21 | 22 | 23 | 24 | 25 | 26 | ... |
|---|---|---|---|---|---|---|---|---|---|---|---|---|---|---|---|---|---|
| 0 | 70 | - | - | - | 77 | - | - | - | 51 | - | - | - | 63 | - | - | - | ... |
| 1 | 66 | 75 | - | - | 77 | 78 | - | - | 57 | 75 | - | - | 63 | 67 | - | - | ... |
| 2 | 66 | 55 | 36 | - | 77 | 66 | 37 | - | 57 | 53 | 69 | - | 63 | 53 | 67 | - | ... |
| 3 | 66 | 55 | 40 | 75 | 77 | 66 | 54 | 78 | 57 | 53 | 71 | 77 | 63 | 53 | 66 | 49 | ... |
| 4 | 61 | 55 | 40 | 66 | 77 | 66 | 54 | 58 | 62 | 53 | 71 | 77 | 62 | 53 | 66 | 40 | ... |
| 5 | 52 | 34 | 40 | 66 | 64 | 54 | 54 | 58 | 64 | 31 | 71 | 77 | 70 | 38 | 66 | 40 | ... |
| 6 | 52 | 33 | 43 | 66 | 64 | 52 | 70 | 58 | 64 | 49 | 72 | 77 | 70 | 43 | 65 | 40 | ... |
| 7 | 52 | 33 | 39 | 57 | 64 | 52 | 69 | 37 | 64 | 49 | 58 | 76 | 70 | 43 | 62 | 31 | ... |
| 8 | 43 | 33 | 39 | 64 | 64 | 52 | 69 | 53 | 65 | 49 | 58 | 70 | 70 | 43 | 62 | 36 | ... |
| 9 |  | 32 | 39 | 64 | 51 | 49 | 69 | 53 | 65 | 67 | 58 | 70 | 77 | 47 | 62 | 36 | ... |
| 10 |  |  | 34 | 64 |  |  | 68 | 53 |  |  | 43 | 70 |  |  | 59 | 36 | ... |
| 11 |  |  |  | 71 |  |  |  | 69 |  |  |  | 63 |  |  |  | 41 | ... |
| ... |  |  |  |  |  |  |  |  |  |  |  |  |  |  |  |  |  |

FIG.15

| CHANNEL NUMBER n | 11 | 12 | 13 | 14 | 15 | 16 | 17 | 18 | 19 | 20 | 21 | 22 | 23 | 24 | 25 | 26 | |
|---|---|---|---|---|---|---|---|---|---|---|---|---|---|---|---|---|---|
| 0 | 70 | - | - | - | 77 | - | - | - | 51 | - | - | - | 63 | - | - | - | ... |
| 1 | 70 | 12 | - | - | 77 | 78 | - | - | 62 | 75 | - | - | 63 | 67 | - | - | ... |
| 2 | 70 | 34 | 36 | - | 77 | 78 | 37 | - | 62 | 75 | 69 | - | 63 | 67 | 67 | - | ... |
| 3 | 70 | 34 | 43 | 75 | 77 | 78 | 70 | 78 | 62 | 75 | 72 | 77 | 63 | 67 | 67 | 49 | ... |
| 4 | 61 | 34 | 43 | 75 | 77 | 78 | 70 | 78 | 62 | 75 | 72 | 77 | 62 | 67 | 67 | 49 | ... |
| 5 | 61 | 34 | 43 | 75 | 77 | 54 | 70 | 78 | 65 | 31 | 72 | 77 | 77 | 38 | 67 | 49 | ... |
| 6 | 61 | 34 | 43 | 75 | 77 | 54 | 70 | 78 | 65 | 67 | 72 | 76 | 77 | 47 | 65 | 49 | ... |
| 7 | 61 | 34 | 43 | 57 | 77 | 54 | 70 | 37 | 65 | 67 | 72 | 76 | 77 | 47 | 65 | 31 | ... |
| 8 | 43 | 34 | 43 | 71 | 51 | 49 | 70 | 69 | 65 | 67 | 72 | 76 | 77 | 47 | 65 | 41 | ... |
| 9 | | 32 | 43 | 71 | | | 70 | 69 | | 67 | 43 | 76 | | 47 | 59 | 41 | ... |
| 10 | | | 34 | 71 | | | 68 | 69 | | | | 63 | | | | 41 | ... |
| 11 | | | | 71 | | | | 69 | | | | | | | | | ... |
| ... | | | | | | | | | | | | | | | | | ... |

FIG.16

| n \ CHANNEL NUMBER | 11 | 12 | 13 | 14 | 15 | 16 | 17 | 18 | 19 | 20 | 21 | 22 | 23 | 24 | 25 | 26 | ... |
|---|---|---|---|---|---|---|---|---|---|---|---|---|---|---|---|---|---|
| 0 | 70* | - | - | - | 77* | - | - | - | 51* | - | - | - | 63* | - | - | - | ... |
| 1 | 68 | 75* | - | - | 77 | 78* | - | - | 54 | 75* | - | - | 63 | 67* | - | - | ... |
| 2 | 66 | 65 | 36* | - | 77 | 72 | 37* | - | 57 | 64 | 69* | - | 63 | 60 | 67* | - | ... |
| 3 | 63 | 55 | 38 | 75* | 77 | 66 | 45 | 78* | 59 | 53 | 70 | 77* | 62 | 53 | 67 | 49* | ... |
| 4 | 61* | 44 | 40 | 71 | 77* | 60 | 54 | 68 | 62* | 42 | 71 | 77 | 62* | 45 | 66 | 45 | ... |
| 5 | 57 | 34* | 41 | 66 | 71 | 54* | 62 | 58 | 63 | 31* | 71 | 77 | 66 | 38* | 66 | 40 | ... |
| 6 | 52 | 34 | 43* | 62 | 64 | 53 | 70* | 47 | 64 | 40 | 72* | 76 | 70 | 40 | 65* | 36 | ... |
| 7 | 48 | 33 | 41 | 57* | 58 | 52 | 70 | 37* | 64 | 49 | 65 | 76* | 73 | 43 | 64 | 31* | ... |
| 8 | 43* | 33 | 39 | 61 | 51* | 50 | 69 | 45 | 65* | 58 | 58 | 73 | 77* | 45 | 62 | 34 | ... |
| 9 | | 32* | 36 | 64 | | 49* | 69 | 53 | | 67* | 50 | 70 | | 47* | 61 | 36 | ... |
| 10 | | | 34* | 68 | | | 68* | 61 | | | 43* | 66 | | | 59* | 39 | ... |
| 11 | | | | 71* | | | | 69* | | | | 63* | | | | 41* | ... |
| ... | ... | ... | ... | ... | ... | ... | ... | ... | ... | ... | ... | ... | ... | ... | ... | ... | |

WIRELESS COMMUNICATION DEVICE AND WIRELESS COMMUNICATION METHOD FOR DETECTING FIELD INTENSITIES OF WIRELESS CHANNELS

CROSS-REFERENCE TO RELATED APPLICATIONS

This application is based upon and claims the benefit of priority from prior Japanese Patent Application No. 2009-133901, filed Jun. 3, 2009, the entire contents of which are incorporated herein by reference.

BACKGROUND OF THE INVENTION

1. Field of the Invention

The present invention relates generally to a wireless communication device and a wireless communication method for detecting the field intensities of wireless channels.

2. Description of the Related Art

In a recent wireless communication system such as the one defined by IEEE 802.15.4, a predetermined range of radio frequency is divided into wireless channels in such a manner as not to overlap one another in a certain bandwidth. Wireless communications are established between wireless communication devices through a selected one of the divided wireless channels.

In order to select a wireless channel, the wireless communication device verifies communication conditions of all the selectable wireless channels. In the verification process for the communication conditions, field intensity detection (energy scanning) is performed on all the wireless channels. The wireless communication device calculates the interference wave levels and the like of the selectable wireless channels in accordance with the results of detecting the field intensities of the channels, and selects a wireless channel that has a good communication condition.

According to Jpn. Pat. Appln. KOKAI Publication No. 2007-311851, for example, the radio field intensity of an access point is measured at predetermined time intervals. When the radio field intensity falls below the first threshold, energy scanning is conducted at certain scanning intervals to connect to another access point having a better communication condition, or in other words an access point having a higher radio field intensity. When the radio field intensity exceeds the third threshold, the energy scanning is terminated. As taught in this technology, however, if the field intensities of all the wireless channels are detected regularly at certain scan intervals, a period of time of "detection time for one wireless channel" multiplied by "the number of wireless channels" is required. Because the time required for the detection of the field intensity of all the wireless channels cannot be shortened, it is difficult to reduce the processing time for selecting a wireless channel of a good communication condition.

In addition, another problem resides in the technology in which the field intensity detection is performed on all the wireless channels at certain scan intervals; it consumes a large amount of electricity on a regular basis.

BRIEF SUMMARY OF THE INVENTION

An object of the invention is to reduce the period of time and consumption of power required for the field intensity detection that is executed when verifying the communication conditions of selectable wireless channels, and thereby to reduce the period of time and consumption of power required for the wireless channel selection process.

According to an embodiment of the present invention, a wireless communication device includes a communication unit configured to communicate with another wireless communication device by use of a wireless channel selected from wireless channels; a detection unit configured to detect field intensities of first wireless channels; and a control unit configured to calculate a field intensity of a second wireless channel based on the field intensities of the first wireless channels, wherein the first wireless channels do not include the second wireless channel.

According to another embodiment of the present invention, a wireless communication method includes detecting field intensities of first wireless channels selected from a plurality of wireless channels when verifying communication conditions of the plurality of wireless channels; and calculating a field intensity of a second wireless channel based on the field intensities of the first wireless channels, wherein the first wireless channels do not include the second wireless channel.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

FIG. 8A is a diagram of an example field intensity table established when the first estimation process is set in step S3.

FIG. 8B is a diagram of an example field intensity table established when the second estimation process is set in step S3.

FIG. 8C is a diagram of an example field intensity table established when the third estimation process is set in step S3.

FIG. 14 is a diagram of an example field intensity table established when the fourth estimation process is set in step S64.

FIG. 15 is a diagram of an example field intensity table established when the fifth estimation process is set in step S64.

FIG. 16 is a diagram of an example field intensity table established when the sixth estimation process is set in step S64.

DETAILED DESCRIPTION OF THE INVENTION

The embodiments of the present invention will be explained in detail below, with reference to the attached drawings. The present invention is not limited to these embodiments, however. The terms of the invention are not limited to the ones adopted here.

Embodiment 1

The structure will be explained first.

Figure 1:
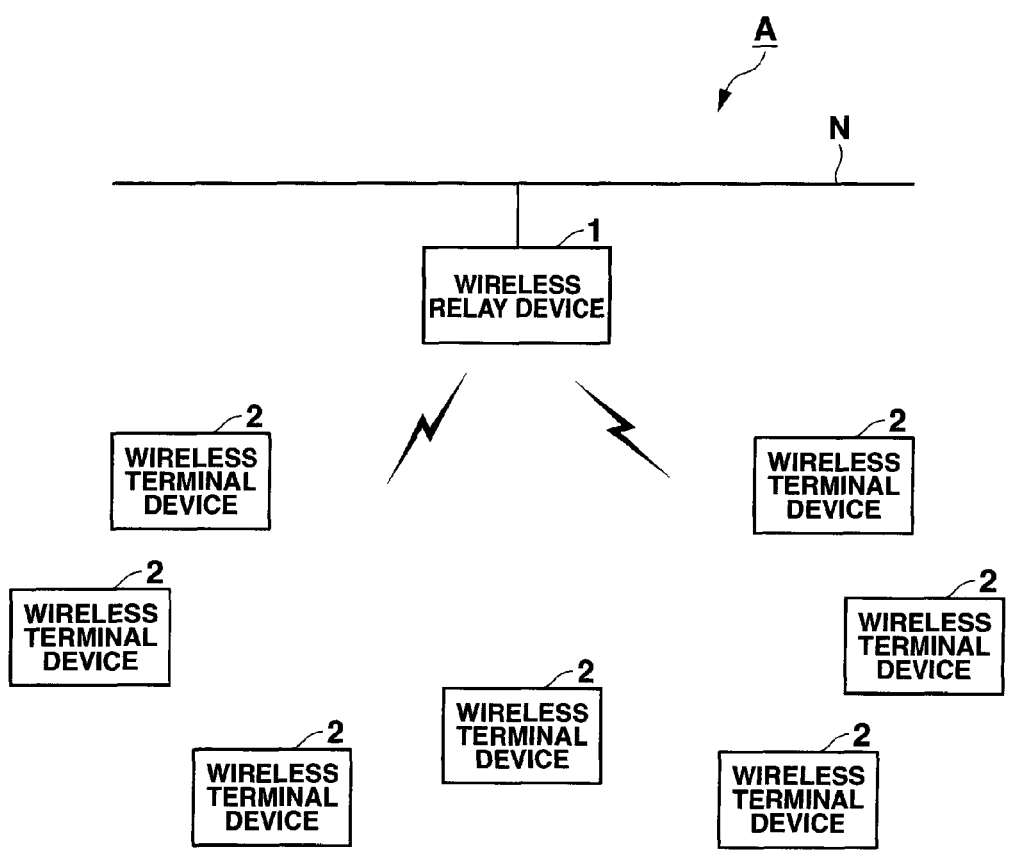
FIG. 1 is a schematic block diagram of a wireless communication system according to the first embodiment.

FIG. 1 is a schematic block diagram of a wireless communication system A according to the first embodiment.

As illustrated in FIG. 1, the wireless communication system A comprises a wireless relay device 1 connected to other wireless relay devices or external devices by way of a communication network N and wireless terminal devices 2 wirelessly connected to the wireless relay device 1.

In the wireless communication system A, one of wireless channels that divide a predetermined frequency range is selected to perform wireless communications between the wireless relay device 1 and the wireless terminal device 2. For instance, a frequency range of 2.4 GHz is divided into 16 channels so as not to overlap each other, channel 11 to channel 26, and wireless communications are conducted between the wireless relay device 1 and the wireless terminal device 2 by use of one of the channels 11 to 26.

Hereinafter, the wireless relay device 1 or an external device and the wireless terminal device 2 are collectively referred to as wireless communication devices.

Figure 2:
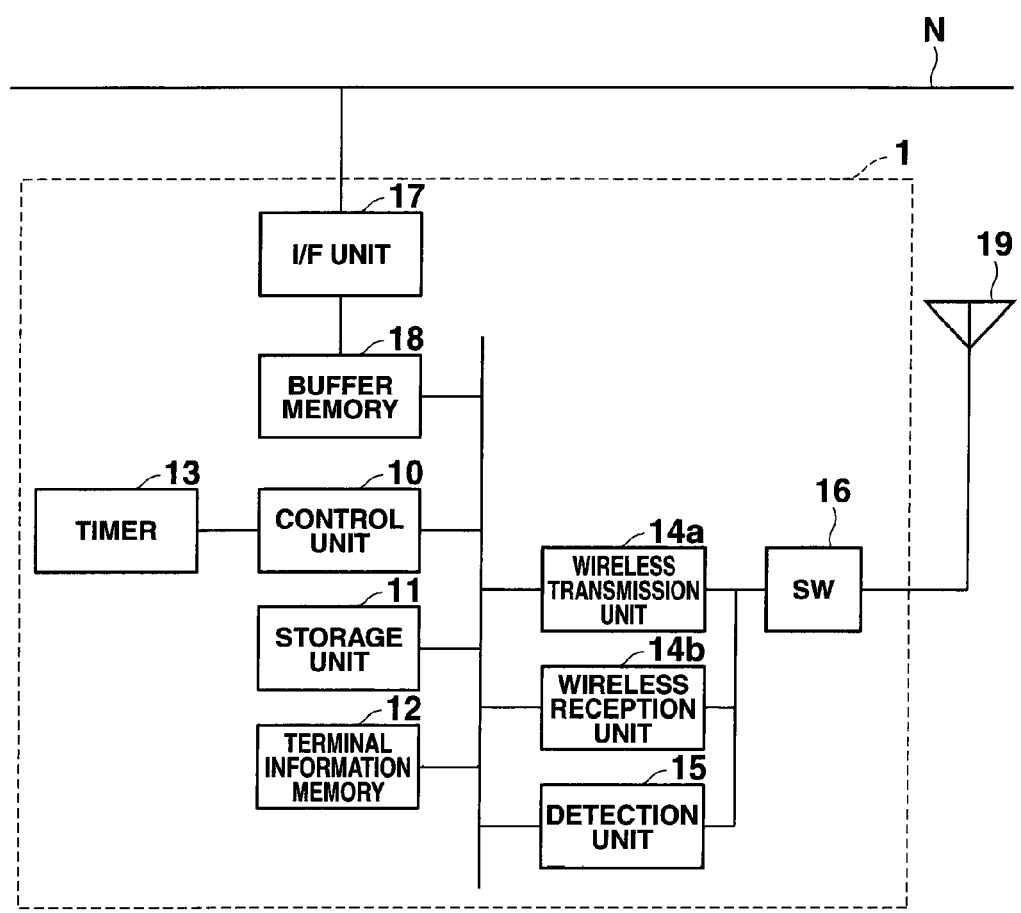
FIG. 2 is a schematic block diagram of a wireless relay device.

FIG. 2 is a schematic diagram of the structure of the wireless relay device 1.

As illustrated in FIG. 2, the wireless relay device 1 comprises a control unit 10, a storage unit 11, a terminal information memory 12, a timer 13, a wireless transmission unit 14a, a wireless reception unit 14b, a detection unit 15, a switch unit (SW) 16, an interface (I/F) unit 17, a buffer memory 18, an antenna 19, and the like, which are electrically connected to one another.

The control unit 10 comprises a central processing unit (CPU), a read only memory (ROM), a random access memory (RAM), and the like. The control unit 10 reads designated programs, tables and data from various programs and various kinds of tables and data stored in the storage unit 11 and the terminal information memory 12. The control unit 10 expands the read-out programs, tables and data onto the RAM or the work area of the storage unit 11 or the terminal information memory 12, and executes various kinds of processing in cooperation with the programs. The control unit 10 stores the processing results into the RAM or a specific area of the storage unit 11 or the terminal information memory 12, and issues instructions to the units of the wireless relay device 1 to control the entire operation of the wireless relay device 1.

The control unit 10 performs a verification process (channel scanning process) for communication conditions of wireless channels to select and determine a wireless channel of the best radio wave condition with the lowest interference level in the wireless frequency band that is divided in advance into different wireless channels, as a wireless channel (in-use channel) that is used for wireless communications with the wireless terminal device 2.

In the channel scanning process according to the first embodiment, when detecting the field intensities of selectable wireless channels (i.e., when executing energy scanning), the detection unit 15 detects the field intensities of wireless channels (detection target channels) that are predetermined from among the selectable wireless channels. Then, based on the field intensities of the detection target channels, an estimation process is executed to calculate estimation values of the field intensities of wireless channels (undetected channels) for which the field intensities are not yet detected.

For example, when the detection target channels in the estimation process according to the first embodiment are channels 11, 14, 17, 20, 23 and 26 out of 16 channels, channels 11 to 26, estimation values of the field intensities are calculated for the undetected channels, i.e., channels 12, 13, 15, 16, 18, 19, 21, 22, 24 and 25. It is assumed here that a channel with a smaller number uses a lower frequency.

The estimation process of the present embodiment includes the first to third estimation processes, and one of the processes is selected and set in advance.

In the first estimation process, the mean value of the field intensities of two detection target channels above and below an undetected channel is calculated for each undetected channel. The calculated mean value is adopted for the estimation value of the field intensity of the undetected channel.

In the second estimation process, for each undetected channel, the higher one of the field intensities of two detection target channels above and below an undetected channel is adopted for the estimation value of the field intensity of the undetected channel.

In the third estimation process, the estimation value of the field intensity of an undetected channel is calculated for each undetected channel in such a manner that a ratio of "the number of wireless channel intervals between two adjacent detection target channels above and below the undetected channel" to "the number of wireless channel intervals between the undetected channel and a detection target channel in an adjacent frequency band that is below the undetected channel" is equal to a ratio of "the difference between the field intensities of the two adjacent detection target channels above and below the undetected channel" to "the difference between the field intensity of the undetected channel and the field intensity of the detection target channel in the adjacent frequency range which is below the undetected channel".

The storage unit 11 is formed of a non-volatile memory such as a magnetic recording medium and an optical recording medium and a semiconductor in which data can be electrically erased and rewritten, and the storage unit 11 is fixed to or detachably arranged in the wireless relay device 1. The storage unit 11 stores in advance various programs to be executed by the control unit 10 and various tables, data, field intensity tables and the like that are to be used in these programs.

The field intensity table according to the present embodiment stores the field intensities of the wireless channels that are detected or estimated.

The terminal information memory 12 is formed of a memory in which data can be electrically erased and rewritten. The terminal information memory 12 stores terminal information such as node addresses representing information specific to each of the wireless terminal devices 2 that are connected to the wireless relay device 1.

The timer 13 measures intervals (scan intervals) of timings of verifying the communication conditions of the wireless channels and outputs a detection timing signal to the control unit 10 at each scan interval.

The wireless transmission unit 14a comprises a modulation circuit, a radio frequency (RF) circuit and the like. The unit 14a adjusts packet transmission power. It also creates a packet by encoding transmission data in accordance with an instruction from the control unit 10, modulates the created packet, and transmits the packet to the wireless terminal device 2 by way of the antenna 19.

The wireless reception unit 14b comprises a demodulation circuit, an RF circuit and the like. The unit 14b adjusts the packet reception sensitivity, and it also demodulates the packet received by way of the antenna 19 and outputs to the control unit 10 the data that is obtained by analyzing the demodulated packet.

A communication unit is realized by the wireless transmission unit 14a, the wireless reception unit 14b and the antenna 19 to perform wireless communications with the wireless terminal device 2, which is a wireless communication device, by use of one of multiple wireless channels.

The detection unit 15 detects the power, noise power, interference power and the like of the wireless channels (channels 11 to 26) used for wireless communications by way of the antenna 19 and detects the field intensity of each wireless channel at regular intervals. The wireless reception unit 14b may be configured to have the power detection function of the detection unit 15.

The SW 16 is arranged between the antenna 19 and the section of the wireless transmission unit 14a, the wireless reception unit 14b and the detection unit 15 so that switching can be performed among the units connected to the antenna 19 (the wireless transmission unit 14a, the wireless reception unit 14b and the detection unit 15) in accordance with an instruction issued by the control unit 10.

The I/F unit 17 controls communications that are performed with another wireless relay device 1 or an external device connected by way of the communication network N, by a certain communication method.

The buffer memory 18 temporarily stores the data received by way of the wired I/F 17.

The wireless terminal device 2 comprises a control unit, a storage unit, a timer, a wireless reception unit, a detection unit, a switching unit (SW), an antenna and the like, which are electrically connected to one another. The wireless terminal device 2 performs wireless communications with the wireless relay device 1 by way of one of the wireless channels.

The wireless terminal device 2 according to the present embodiment executes a channel scanning process in the same manner as the wireless relay device 1 when, for example, the communication condition of the in-use channel deteriorates and a different wireless channel needs to be found to perform wireless communications with the wireless relay device 1.

The channel scanning process executed by the wireless terminal device 2 is the same as the channel scanning process executed by the wireless relay device 1, and thus illustration and explanation thereof is omitted. Because the wireless terminal device 2 executes the same channel scanning process as the wireless relay device 1 does, both the wireless relay device 1 and the wireless terminal device 2 are realized as wireless communication devices.

Next, the operation of the present embodiment will be explained.

Figure 3:
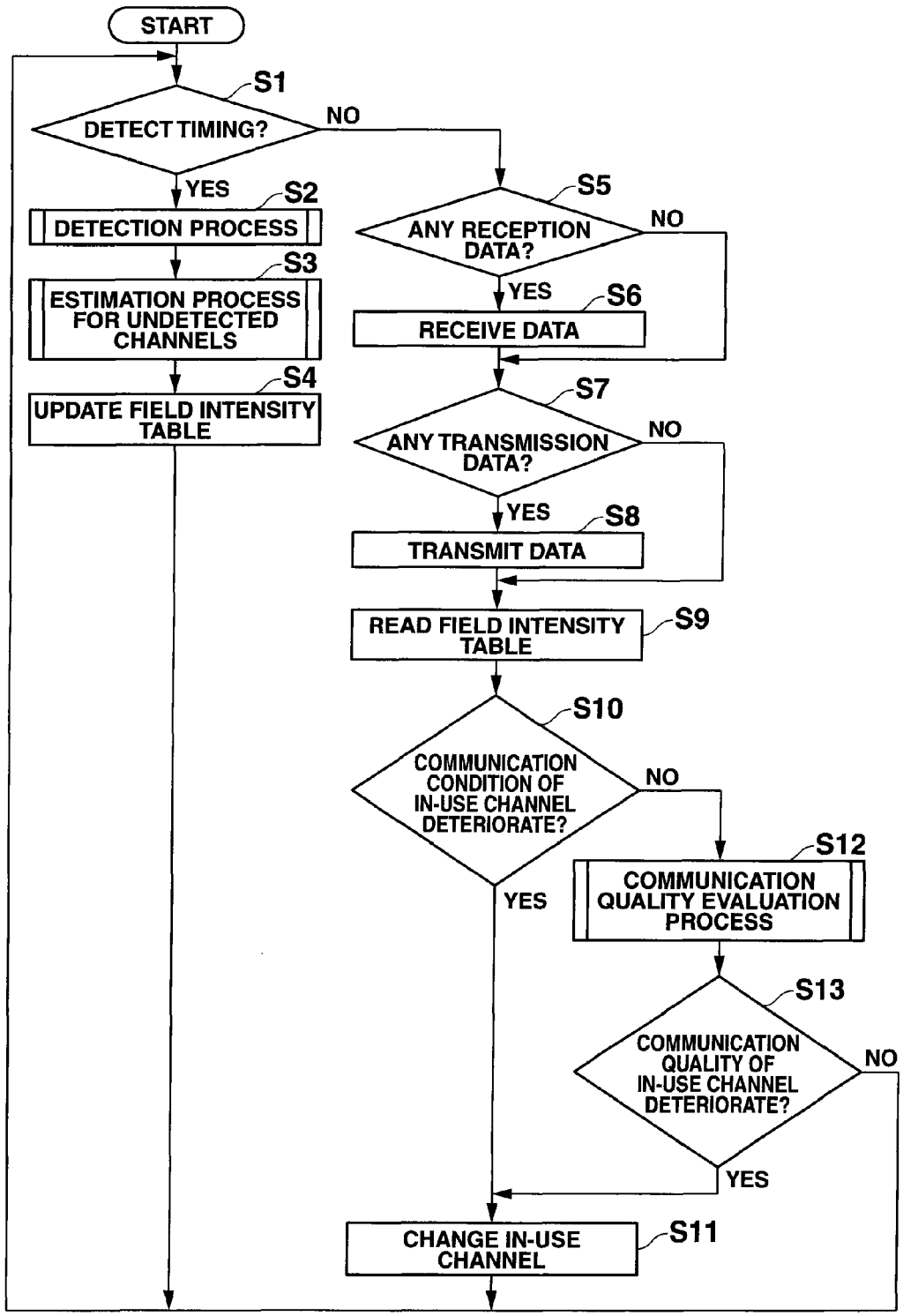
FIG. 3 is the main flowchart of a channel scanning process according to the first embodiment.

FIG. 3 is the main flowchart of the channel scanning process according to the present embodiment executed by the wireless relay device 1. The process indicated in FIG. 3 is executed in cooperation between the control unit 10 and other units of the wireless relay device 1 when the power is being supplied to the wireless relay device 1.

The control unit 10 determines whether or not a detection timing signal is input from the timer 13 (step S1). When the detection timing signal is input (YES in step S1), the control unit 10 executes a detection process (energy scanning) (step S2), and executes an estimation process on undetected channels (step S3). One of the first to third estimation processes is selected in advance as an estimation process to be executed in step S3.

The control unit 10 writes the field intensities of the wireless channels detected in step S2 or estimated in step S3 into the field intensity table so that the field intensity table is updated (step S4), and the process returns to step S1.

When no detection timing signal is input (NO in step S1), the control unit 10 determines whether or not there is any data that is to be received by the wireless reception unit 14b by way of the antenna 19 (step S5). When there is no such data (NO in step S5), the control unit 10 proceeds to step S7. When there is data to be received (YES in step S5), the control unit 10 executes a reception process for this data (step S6).

After step S6 or step S5 (if NO in this step), the control unit 10 determines whether or not there is any data that is to be transmitted from the wireless transmission unit 14a (step S7). When there is no such data (NO in step S7), the control unit 10 proceeds to step S9. When there is data to be transmitted (YES in step S7), the control unit 10 executes a transmission process for this data (step S8).

After step S8 or step S7 (if NO in this step), the control unit 10 reads the field intensity table from the storage unit 11 (step S9), and determines whether or not the communication condition of the wireless channel (in-use channel) currently being used by the wireless transmission unit 14a and the wireless reception unit 14b to perform wireless communications with the wireless terminal device 2 deteriorates (step S10).

In step S10, whether or not the field intensity of the in-use channel is greater than a predetermined threshold value is judged by referring to the field intensity table. When the field intensity of the in-use channel is greater than the threshold value, it is determined that the communication condition deteriorates.

If the communication condition of the in-use channel deteriorates (YES in step S10), the control unit 10 changes the in-use channel to a wireless channel in the best communication condition (i.e., the one having the smallest field intensity) by referring to the field intensity table (step S11), and returns to step S1.

When the communication condition of the in-use channel does not deteriorate (NO in step S10), the control unit 10 executes a communication quality evaluation process (step S12).

In the communication quality evaluation process executed in step S12, whether or not the communication quality of the in-use channel deteriorates is evaluated by judging, for example, whether the ACK reception rate or the packet error incidence rate regarding the data transmitted in the in-use channel is larger than or equal to a predetermined percentage.

After step S12, the control unit 10 determines whether or not the communication quality of the in-use channel deteriorates (step S13). When the communication quality of the in-use channel deteriorates (YES in step S13), the control unit 10 proceeds to step S11. When the communication quality of the in-use channel does not deteriorate (NO in step S13), the control unit 10 returns to step S1.

Figure 4:
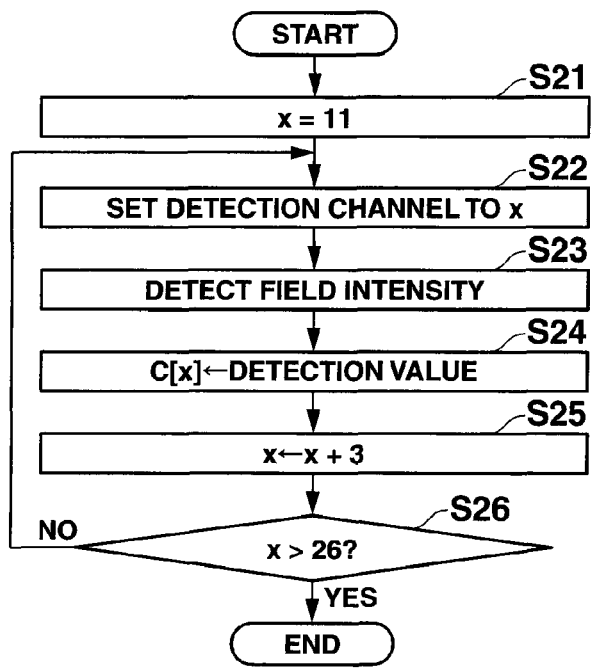
FIG. 4 is a flowchart of the detection process according to the first embodiment.

FIG. 4 is a flowchart of the detection process according to the present embodiment executed in step S2. In the detection process indicated in FIG. 4, it is assumed that every three channels are selected, starting with channel 11 (i.e., channels 11, 14, 17, 20, 23 and 26) and the selected six wireless channels are determined as detection target channels.

First, the control unit 10 sets a variable x to 11 (step S11). Then, the control unit 10 sets the wireless channel for which the field intensity is to be detected (detection target channel) to the wireless channel having a number indicted by the variable x (step S22).

The control unit 10 causes the detection unit 15 to detect (scan) the field intensity of the detection target channel (step S23), and determines the detection value detected by the detection unit 15 as the field intensity C[x] of the detection target channel (step S24).

The control unit 10 adds 3 to the variable x to set a new variable x (step S25), and determines whether or not the variable x is greater than the maximum number of the configurable wireless channels (26 in this example) (step S26).

When the variable x is smaller than or equal to 26 (NO in step S26), the control unit 10 returns to step S22. When the variable x is greater than 26 (YES in step S26), the control unit 10 terminates the process.

Next, the first to third estimation processes executed in step S3 will be explained with reference to the flowcharts of FIGS. 5 to 7. In step S3, one of the processes indicated in FIGS. 5 to 7 is executed.

Figure 5:
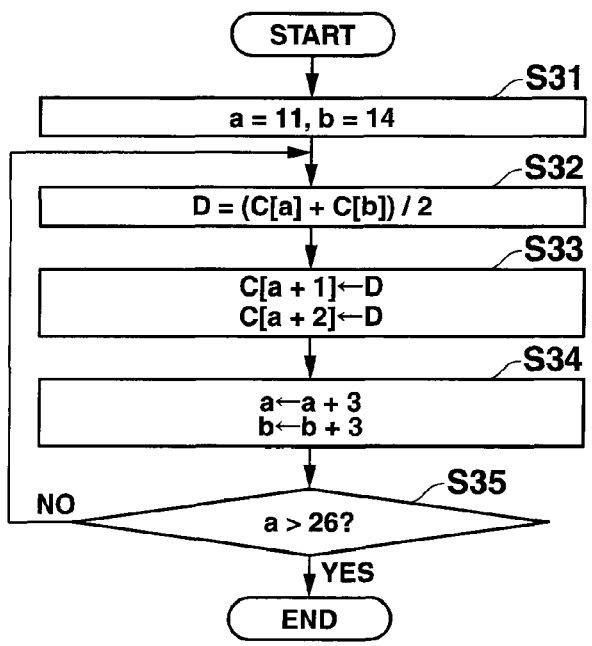
FIG. 5 is a flowchart of the first estimation process.
Figure 6:
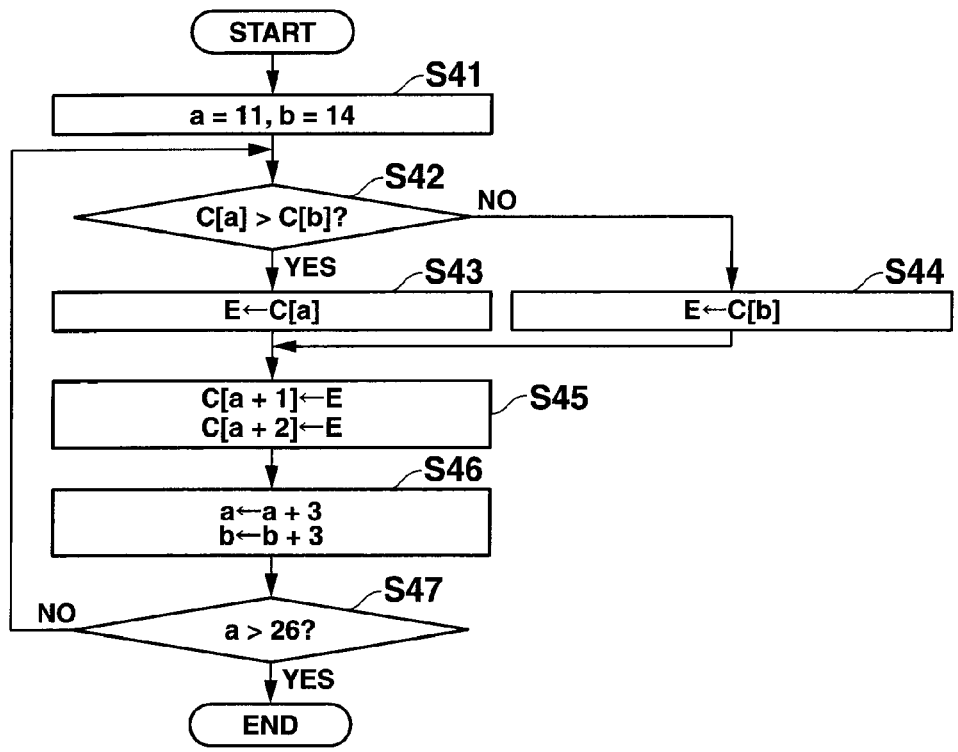
FIG. 6 is a flowchart of the second estimation process.
Figure 7:
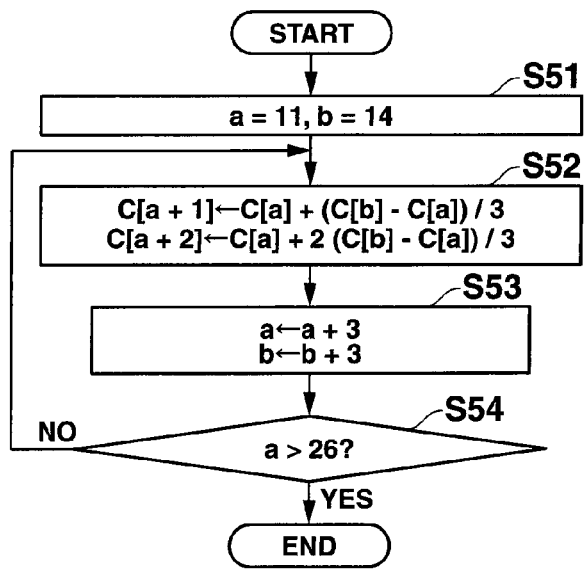
FIG. 7 is a flowchart of the third estimation process.

In the estimation processes of FIGS. 5 to 7, it is assumed that every three channels are selected, starting with channel 11 (i.e., channels 11, 14, 17, 20, 23 and 26), and the detection target channels are set to these selected wireless channels.

FIG. 5 is a flowchart of the first estimation process.

First, the control unit 10 sets the variable a to 11, and the variable b to 14, which is obtained by adding 3 to the variable a (step S31). The variables a and b represent the numbers of the detection target channels that are to be referred to.

The control unit 10 calculates an average value D of the field intensity C[a] of a wireless channel having the number indicated by the variable a and the field intensity C[b] of a wireless channel having the number indicated by the variable b, in accordance with the following equation (1) (step S32).

$$D=(C[a]+C[b])/2 \quad (1)$$

The control unit 10 determines the average value D calculated in step S32 as the field intensity C[a+1] of the wireless channel having the number obtained by adding 1 to the variable a, and also as the field intensity C[a+2] of the wireless channel having the number obtained by adding 2 to the variable a (step S33).

The control unit 10 sets a new variable a by adding 3 to the variable a, and sets a new variable b by adding 3 to the variable b (step S34). The control unit 10 determines whether the variable a is greater than the maximum number of the settable wireless channels (26 in this example) (step S35).

The control unit 10 returns to step S32 when the variable a is smaller than or equal to 26 (NO in step S35), and the control unit 10 terminates the process when the variable a is greater than 26 (YES in step S35).

FIG. 8A shows an example field intensity table created when the first estimation process is set in step S3. In FIG. 8A, the shaded channel numbers (11, 14, 17, 20, 23 and 26) and field intensities of the wireless channels are the detection target channels and the field intensities detected in step S2. Furthermore, the non-shaded channel numbers (12, 13, 15, 16, 18, 19, 21, 22, 24 and 25) and field intensities of the wireless channels are undetected channels and field intensities estimated in the first estimation process.

As illustrated in FIG. 8A, the field intensity of an undetected channel is the mean value of the field intensities of two detection target channels above and below this channel.

For example, as illustrated in FIG. 8A, when the undetected channels are channels 12 and 13, and two detection target channels above and below channels 12 and 13 are channels 11 and 14, the mean value 66 of the field intensity 53 of channel 11 and the field intensity 78 of channel 14 serves as the estimated value of the field intensity of each of channels 12 and 13.

In this manner, in the first estimation process, the mean value of the field intensities of two detection target channels above and below an undetected channel is employed as the estimated value of the field intensity of the undetected channel.

FIG. 6 is a flowchart of the second estimation process.

First, the control unit 10 sets the variable a to 11, and the variable b to 14, which is obtained by adding 3 to the variable a (step S41). The variables a and b represent the numbers of the detection target channels that are to be referred to.

The control unit 10 determines whether or not the field intensity C[a] of the wireless channel of the number indicated by the variable a is greater than the field intensity C[b] of the wireless channel of the number indicated by the variable b (step S42).

When the field intensity C[a] is greater than the field intensity C[b] (YES in step S42), the control unit 10 determines the field intensity C[a] of the wireless channel of the number indicated by the variable a as a selected field intensity E (step S43).

When the field intensity C[a] is smaller than or equal to the field intensity C[b] (NO in step S42), the control unit 10 determines the field intensity C[b] of the wireless channel of the number indicated by the variable b as the selected field intensity E (step S44).

The control unit 10 determines that the field intensity C[a+1] of the wireless channel of the number indicated by a value obtained by adding 1 to the variable a and the field intensity C[a+2] of the wireless channel of the number indicated by a value obtained by adding 2 to the variable a are the selected field intensity E set in step S43 or S44 (step S45).

The control unit 10 adds 3 to the variable a to set a new variable a, and 3 to the variable b to set a new variable b (step S46). The control unit 10 determines whether or not the variable a is greater than the maximum number of the configurable wireless channels (26 in this example) (step S47).

When the variable a is smaller than or equal to 26 (NO in step S47), the control unit 10 returns to step S42, and when the variable a is greater than 26 (YES in step S47), the process is terminated.

FIG. 8B shows an example field intensity table established when the second estimation process is set in step S3. In FIG. 8B, the shaded channel numbers (11, 14, 17, 20, 23 and 26) and field intensities of wireless channels are the detection target channels and the field intensities detected in step S2. In addition, the non-shaded channel numbers (12, 13, 15, 16, 18, 19, 21, 22, 24 and 25) and field intensities of wireless channels are undetected channels and field intensities estimated in the second estimation process.

As illustrated in FIG. 8B, the field intensity of an undetected channel is a higher one of the field intensities of the two detection target channels above and below the undetected channel.

For example, as illustrated in FIG. 8B, when the undetected channels are channels 12 and 13 and the two detection target channels above and below channels 12 and 13 are channels 11 and 14, the higher one of the field intensity 53 of channel 11 and the field intensity 78 of the channel 14, which is the field intensity 78, becomes the estimated value for the channels 12 and 13.

In this manner, in the second estimation process, the higher one of the field intensities of the two detection target channels above and below the undetected channel is employed as the estimated value of the field intensity of an undetected channel.

According to the first embodiment, because the field intensity is detected for every three wireless channels, there are two undetected channels between any two detection target channels. For this reason, in steps S33 and S45, the field intensities (C[a+1] and C[a+2]) of the two undetected channels between two detection target channels are determined either as the average value D of the field intensities of the two detection target channels (i.e., the wireless channels indicated by the variables a and b) above and below the undetected channels or as the greater one of the field intensities (selected field intensity E) of the two detection target channels.

FIG. 7 is a flowchart of the third estimation process.

First, the control unit 10 sets the variable a to 11, and the variable b to 14, which is obtained by adding 3 to the variable a (step S51). The variables a and b represent the number of detection target channels that are used for reference.

In accordance with the following equations (2) and (3), the control unit 10 calculates the field intensity C[a+1] of the wireless channel of the number indicated by a value obtained by adding 1 to the variable a and the field intensity C[a+2] of the wireless channel of the number indicated by a value obtained by adding 2 to the variable a (step S52).

$$C[a+1]=C[a]+(C[b]-C[a])/3 \quad (2)$$

$$C[a+2]=C[a]+2(C[b]-C[a])/3 \quad (3)$$

From the equation (2), the field intensity C[a+1] of an undetected channel is calculated in such a manner that the ratio (1:3) of "the number of channel intervals (=1) between the undetected channel (i.e. the wireless channel of the number indicated by variable a+1) and the detection target channel below the undetected channel (i.e., the wireless channel of the number indicated by the variable a)" to "the number of channel intervals (=3) between the two detection target channels (i.e. the wireless channels of the numbers indicated by the variables a and b) above and below the undetected wireless channel" becomes equal to the ratio (C[a+1]–C[a]):(C[b]–C[a]) of "the difference C[a+1]–C[a] between the field intensity C[a+1] of the undetected wireless channel and the field intensity C[a] of the detection target channel below the undetected wireless channel" to "the difference C[b]–C[a] between the field intensities of the two detection target channels above and below the undetected wireless channel".

From the equation (3), the field intensity C[a+2] of the undetected channel is calculated in such a manner that the ratio (2:3) of "the number of channel intervals (=2) between the undetected channel (i.e., the wireless channel of the number indicated by variable a+2) and the detection target channel below the undetected channel (i.e. the wireless channel of the number indicated by the variable a)" to "the number of intervals (=3) between the two detection target channels (i.e., the wireless channels of the numbers indicated by the variables a and b) above and below the undetected wireless channel" becomes equal to the ratio (C[a+2]–C[a]:C[b]–C[a]) of "the difference C[a+2]–C[a] between the field intensity C[a+2] of the undetected wireless channel and the field intensity C[a] of the detection target channel below the undetected wireless channel" to "the difference C[b]–C[a] between the field intensities of the detection target channels above and below the undetected wireless channel".

The control unit 10 adds 3 to the variable a to set up a new variable a, and 3 to the variable b to set up a new variable b (step S53), and determines whether or not the variable a is greater than the maximum number of the configurable wireless channels (26 in this example) (step S54).

When the variable a is smaller than or equal to 26 (NO in step S54), the control unit 10 returns to step S52, and when the variable a is greater than 26 (YES in step S54), the control unit 10 terminates the process.

FIG. 8C shows an example field intensity table established when the third estimation process is set in step S3. In FIG. 8C, the shaded channel numbers (11, 14, 17, 20, 23 and 26) and field intensities of wireless channels are the detection target channels and the field intensities detected in step S2. Furthermore, the non-shaded channel numbers (12, 13, 15, 16, 18, 19, 21, 22, 24 and 25) and field intensities of wireless channels are undetected channels and the field intensities estimated in the third estimation process.

As illustrated in FIG. 8C, the field intensity of an undetected channel is based on the ratio of the numbers of wireless channel intervals and the ratio of the field intensity differences.

For example, as illustrated in FIG. 8C, when the undetected channel is channel 12 and the two detection target channels above and below channel 12 are channels 11 and 14, the number of channel intervals between channels 12 and 11 is 1, and the number of channel intervals between channels 11 and 14 above and below channel 12 is 3. Thus, the ratio of wireless channel intervals is 1 to 3.

Further, the value of C[12] is calculated in such a manner that the ratio (ratio of field intensity differences) of the difference C[12]–C[11] between the field intensity C[12] of channel 12 and the field intensity C[11] (=53) of the channel 11 below channel 12 to the difference C[14]–C[11] between the field intensity C[11] (=53) of channel 11 below channel 12 and the field intensity C[14] (=78) of channel 14 above channel 12 becomes equal to the ratio of wireless channel intervals, 1 to 3. The calculated value (61) is the estimated value for the field intensity of channel 12.

The estimated value is calculated in a similar manner for the undetected channel 13 that is adjacent to channel 12, which results in 70.

In this manner, the estimated value of the field intensity of an undetected channel can be obtained in the third estimation process by making the ratio of wireless channel intervals equal to the ratio of differences of the field intensities of wireless channels.

As explained above, according to the present embodiment, when verifying the communication conditions of multiple wireless channels, the detection unit detects the field intensities of detection target channels predetermined from among the wireless channels, and the estimated values of the field intensities of the remaining undetected channels are calculated, based on the field intensities of the detection target channels for which the field intensity detection has been performed by the detection unit.

Hence, because the field intensity detection does not have to be conducted on all the wireless channels, time and power required for the field intensity detection can be reduced when verifying the communication conditions of the wireless channels, and therefore time and power required for the wireless channel selection process can be reduced.

Embodiment 2

First, the structure will be explained.

The general structure of the wireless communication system according to the second embodiment is the same as that of the wireless communication system according to the first embodiment illustrated in FIG. 1, and thus the illustration and explanation thereof is omitted.

The general structure of the wireless relay device 1 according to the second embodiment is the same as the first embodiment, and thus the illustration is omitted and the explanation focuses on the differences only. That is, a wireless terminal device 2 executes a channel scanning process similar to the one executed by the wireless relay device 1, and wireless communication devices include the wireless relay devices 1 and the wireless terminal device 2.

The control unit 10 performs a channel scanning process to select a wireless channel having the least interference and the best radio wave condition from the wireless frequency range that is divided in advance into multiple wireless channels, as a wireless channel (in-use channel) that is to be used during wireless communications with the wireless terminal device 2.

In the channel scanning process according to the second embodiment, when detecting the field intensities of selectable wireless channels (i.e., when executing energy scanning), the detection unit 15 detects the field intensities of several wireless channels (detection target channels) predetermined from the multiple wireless channels. When the first energy scanning is finished, the detection target channels are shifted in the frequency direction.

Each time of scanning, an estimation process is executed to calculate the estimated values of the field intensities of undetected channels for which the field intensity detection is not performed, based on the field intensities detected by the scanning operation and also the field intensities detected by a scanning operation prior to the current scanning operation.

According to the second embodiment, detection target channels are shifted in the frequency direction at every scanning. For example, among 16 channels, i.e., channels 11 to 26, the field intensity detection is performed on six channels 11, 14, 17, 20, 23 and 26 as detection target channels in the first scanning, and then the field intensity detection is performed on five channels 12, 15, 18, 21 and 24 as detection target channels at in the second scanning.

When, for example, the field intensity of the channel 11 is detected in the first and fourth scanning, the estimated value of the field intensity of channel 11 is calculated in the second and third scanning, based on the detected field intensity of channel 11 of the first and fourth scanning.

The estimation process according to the second embodiment includes the following fourth to sixth estimation processes, one of which is selected and set in advance.

In the fourth estimation process, the estimated value of the field intensity of a channel that is not detected in a scanning operation is determined from the mean value of two field intensities detected in two scanning operations prior to and subsequent to the scanning operation of interest, in which the field intensity detection is performed on the channel.

In the fifth estimation process, the estimated value of the field intensity of a channel that is not detected at a scanning operation is a greater one of the field intensity detected in the scanning operation executed prior to the scanning operation of interest in which the field intensity detection is performed on the channel and the field intensity detected in the scanning operation executed subsequent to the scanning operation of interest in which the field intensity detection is performed on the channel.

In the sixth estimation process, the estimated value of the field intensity of a channel that is not detected in a scanning operation is calculated in such a manner that the ratio of "a difference in the number of scanning operations between the scanning operation of interest and the scanning operation for detecting the channel of interest" to "a difference in the number of scanning operations between two scanning operations for detecting the channel of interest" is equal to the ratio of "the difference between the estimated value and the field intensity detected in the previous scanning" to "the difference between the field intensity detected in the scanning operation prior to the scanning operation in which the estimation is made and the field intensity detected in the scanning operation subsequent to the scanning operation in which the estimation is made".

The wireless terminal device 2 of the second embodiment has the same structure as that of the first embodiment, and executes the same channel scanning process as the one executed by the wireless relay device 1 of the second embodiment. The structure and channel scanning process of the wireless terminal device 2 is therefore omitted from the explanation.

Next, the operation of the second embodiment is explained.

Figure 9:
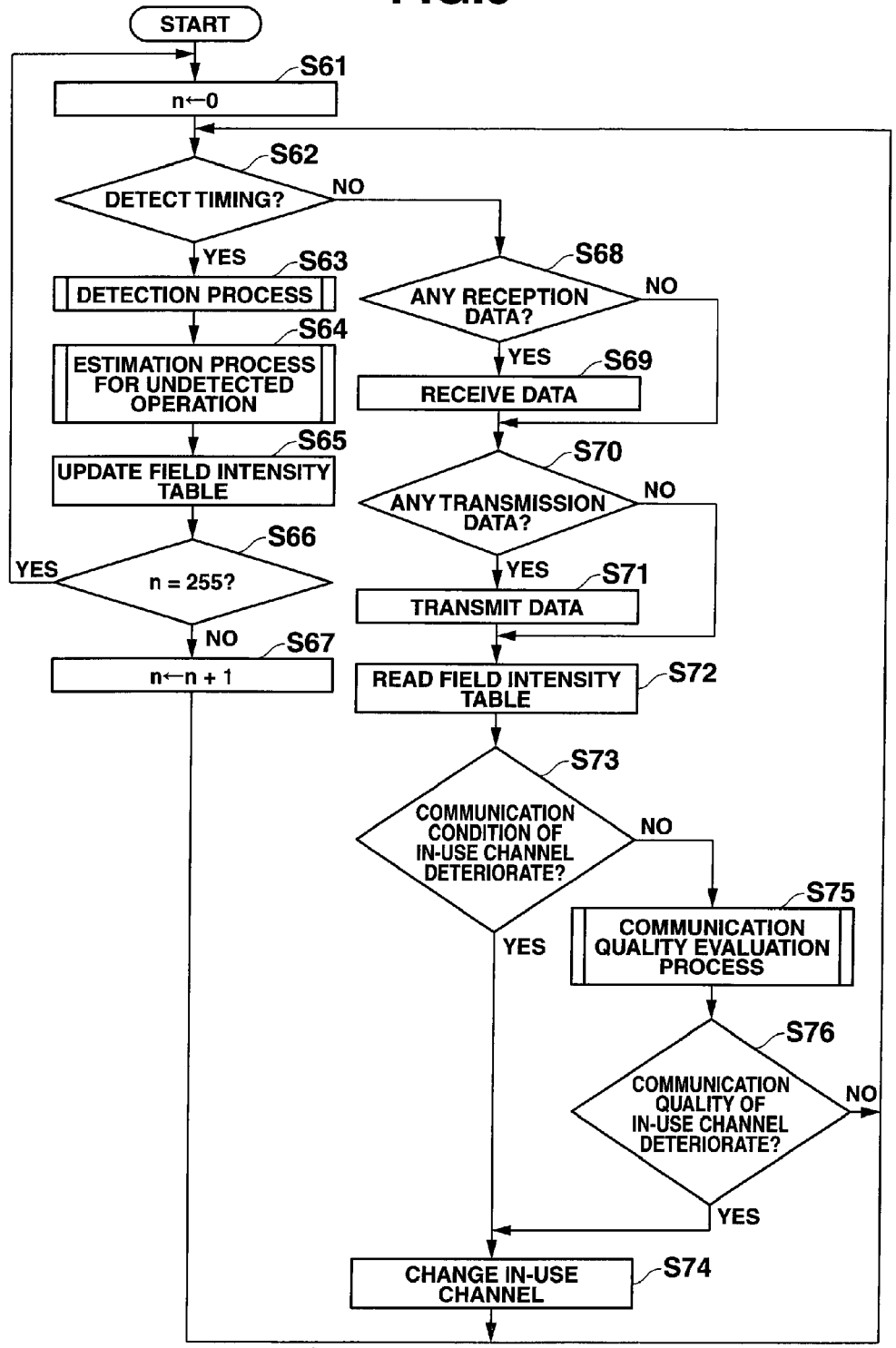
FIG. 9 is the main flowchart of a channel scanning process according to the second embodiment.

FIG. 9 is the main flowchart of the channel scanning process executed by the wireless relay device 1 according to the second embodiment. The process indicated in FIG. 9 is executed in coordination between the control unit 10 and other units of the wireless relay device 1 when the power is being supplied to the wireless relay device 1.

First, the control unit 10 sets a counter value n of a counter that counts the number of scanning operations, to 0 (step S61).

The control unit 10 determines whether or not a detection timing signal is input from the timer 13 (step S62). When the detection timing signal is input (YES in step S62), the control unit 10 executes a detection process (energy scanning) (step S63), and executes an estimation process (step S64). As the estimation process executed in step S64, one of the fourth to sixth estimation processes is preset.

The control unit 10 writes the field intensities of the wireless channels detected in step S63 or estimated in step S64 into the field intensity table and thereby updates the field intensity table (step S65), and determines whether or not the counter value n representing the number of scanning operations is 255 (step S66).

It is assumed in step S66 that 8-bit control is conducted and thus the maximum counter value is set to 254, but the maximum counter value may be any number larger than or equal to the number of wireless channels.

When the counter value n representing the number of scanning operations is 255 (YES in step S66), the control unit 10 returns to step S61. When the counter value n representing the number of scanning operations is not 255 (NO in step S66), the control unit 10 increments the counter value n representing the number of scanning operations by 1 to set a new counter value (step S67), and returns to step S62.

When a detection timing signal is not input (NO in step S62), the control unit 10 proceeds to step S68. The process of steps S68 to S76 is substantially the same as the process of steps S5 to S13 of the first embodiment, except that, when reading the field intensity table from the storage unit 11 in step S72, data (field intensity records) regarding the latest scanning operation (counter value n−3) containing the field intensities of all the wireless channels is read. The explanation is therefore omitted.

Figure 10:
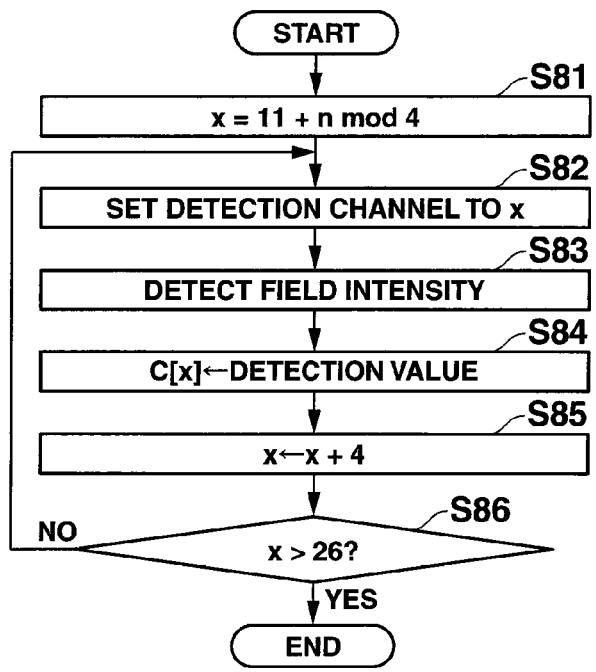
FIG. 10 is a flowchart of a detection process according to the second embodiment.

FIG. 10 is a flowchart of the detection process executed in step S63 according to the second embodiment. In the detection process of FIG. 10, it is assumed that the initial detection target channels are set to every four wireless channels (e.g., channels 11, 15, 19 and 23).

First, the control unit 10 divides the counter value n representing the number of scanning operations by 4 and adds the remainder to 11, and sets the obtained value (11+n mod 4) as the variable x (step S81). The process of steps S82 to S84 is the same as that of steps S22 to S24 of the first embodiment, and thus the explanation is omitted.

The control unit 10 adds 4 to the variable x to set a new variable x (step S85), and determines whether or not the variable x is greater than the maximum number of the settable wireless channels (26 in this example) (step S86).

When the variable x is smaller than or equal to 26 (NO in step S86), the control unit 10 returns to step S82. When the variable x is greater than 26 (YES in step S86), the control unit 10 terminates the process.

Figure 11:
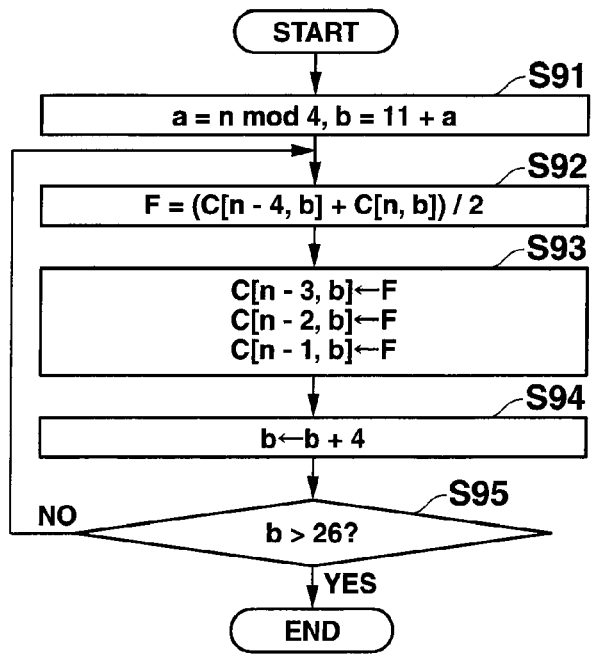
FIG. 11 is a flowchart of the fourth estimation process.
Figure 12:
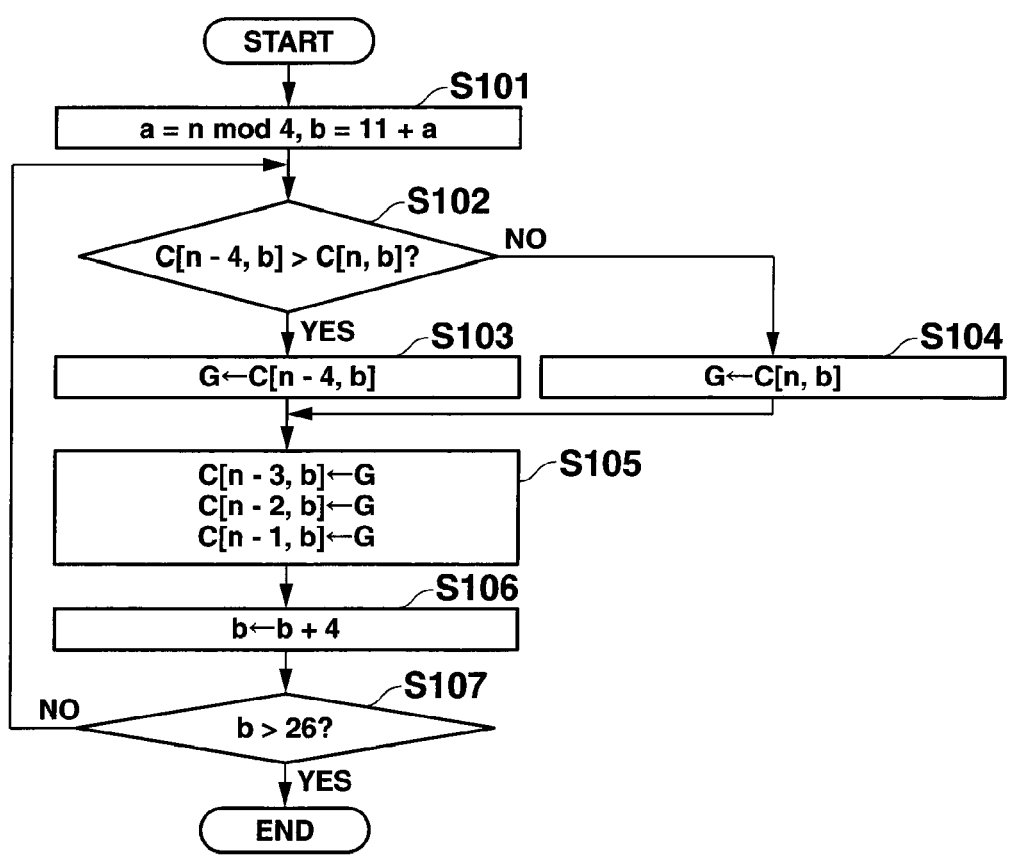
FIG. 12 is a flowchart of the fifth estimation process.
Figure 13:
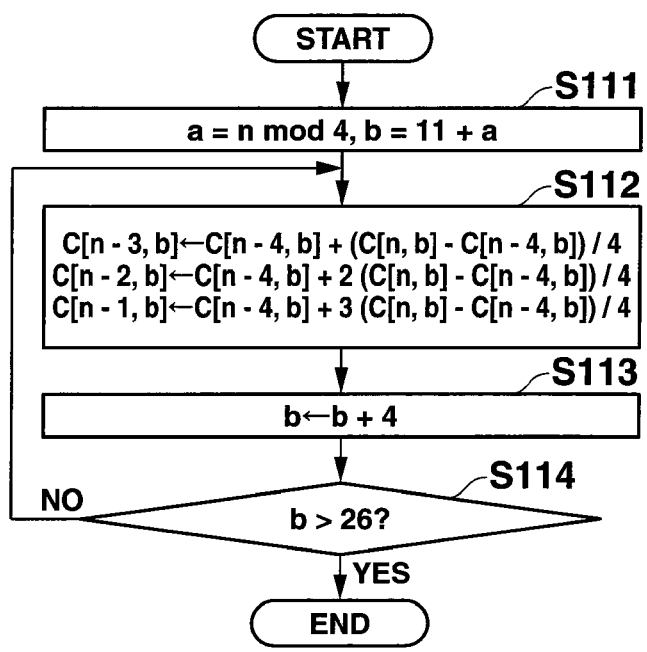
FIG. 13 is a flowchart of the sixth estimation process.

Next, the fourth to sixth estimation processes executed in step S64 are explained with reference to the flowcharts of FIGS. 11 to 13. One of the processes indicated in FIGS. 11 to 13 is executed in step S64. Because the detection target channels are every four wireless channels in FIGS. 11 to 13, once the field intensity of a detection target channel is detected at a certain scanning operation, it is not detected for the next three scanning operations.

FIG. 11 is a flowchart of the fourth estimation process.

First, the control unit 10 divides the counter value n representing the number of scanning operations by 4 and sets the remainder (n mod 4) to the variable a, while it adds 11 to the variable a and sets the value to the variable b (step S91). The variable b indicates the number of the detection target channel that is referred to in the n-th scanning operation.

In accordance with the equation (4), the control unit 10 calculates an mean value F of the field intensity $C[n-4,b]$ of the wireless channel of the number indicated by the variable b detected in the (n−4)th scanning operation and the field intensity $C[n,c]$ of the wireless channel of the number indicated by the variable b detected in the n-th scanning operation (step S92).

$$F=(C[n-4,b]+C[n,b])/2 \quad (4)$$

The control unit 10 determines the mean value F calculated in step S92, as the field intensities $C[n-1,b]$, $C[n-2,b]$, and $C[n-3,b]$ of the wireless channel of the number indicated by the variable b in the (n−1)th, (n−2)th and (n−3)th scanning operations, respectively, in which the field intensity detection is not performed on this channel, prior to the n-th scanning operation (step S93).

The control unit 10 adds 4 to the variable b to set a new variable b (step S94), and determines whether or not the variable b is greater than the maximum number of the configurable wireless channels (26 in this example) (step S95).

When the variable b is smaller than or equal to 26 (NO in step S95), the control unit 10 returns to step S92, while, when the variable b is greater than 26 (YES in step S95), the control unit 10 terminates the process.

FIG. 14 is an example field intensity table established when the fourth estimation process is set in step S64. FIG. 14 shows an example of the field intensity table when the counter value n representing the number of scanning operations is 11. In FIG. 14, in the n-th scanning operation, the shaded field intensities are detected in step S63, and the non-shaded field intensities are estimated by the fourth estimation process.

Because a detection value of the previous scanning is required for the estimation, when no detection value for the field intensity obtained in the previous scanning is available, the estimated value of the field intensity is not calculated and is indicated by "−" in FIG. 14.

Furthermore, in FIG. 14, the field intensities of wireless channels that are not detection target channels in a certain scanning operation (e.g., n=11) are left blank, but the field intensities of the channels that are not detection target channels may be set to the latest detected field intensities of the corresponding wireless channels.

As shown in FIG. 14, the field intensity (estimated value) of any wireless channel in the non-detected scanning is the mean value of the detected field intensities obtained in the preceding and following scanning operations.

For instance, as shown in FIG. 14, when the field intensity of channel 11 is not detected in the first scanning operation but is detected in the 0th and 4th scanning operations, the mean value, 66, of the detected field intensity 70 of the channel 11 in the 0th scanning operation and the detected field intensity 61 of the channel 11 in the fourth scanning operation becomes the estimated value of the field intensity of the channel 11 for the first, second and third scanning operations.

In this manner, in the fourth estimation process, the estimated value of the field intensity of a channel that is not detected in a certain scanning operation is the mean value of two field intensities detected in two scanning operations in which the field intensity detection is performed on this channel.

FIG. 12 is a flowchart of the fifth estimation process.

First, the control unit 10 divides the counter value n representing the number of scanning operations by 4 and sets the remainder (n mod 4) to the variable a, and adds 11 to the variable a and sets the obtained value to the variable b (step S101). The variable b represents the number of the detection target channel that is referred to in the n-th scanning operation.

The control unit 10 determines whether or not the field intensity $C[n-4,b]$ of the wireless channel of the number indicated by the variable b in the (n−4)th scanning operation is greater than the field intensity $C[n,b]$ of the wireless channel of the number indicated by the variable b in the n-th scanning operation (step S102).

When the field intensity $C[n-4,b]$ of the wireless channel of the number indicated by the variable b that is detected in the (n−4)th scanning operation is greater than the field intensity $C[n,b]$ of the wireless channel of the number indicated by the variable b that is detected at the n-th scanning (YES in step S102), the control unit 10 determines the field intensity $C[n-4,b]$ of the wireless channel of the number indicated by the variable b that is detected in the (n−4)th scanning operation, as a selected field intensity G (step S103).

When the field intensity $C[n-4,b]$ of the wireless channel of the number indicated by the variable b that is detected in the (n−4)th scanning operation is smaller than or equal to the field intensity $C[n,b]$ of the wireless channel of the number indicated by the variable b that is detected in the n-th scanning operation (NO in step S102), the control unit 10 determines the field intensity $C[n,b]$ of the wireless channel of the number indicated by the variable b that is detected in the n-th scanning operation, as the selected field intensity G (step S104).

The control unit 10 determines the selected field intensity G set in step S102 or S103, as the estimated field intensities $C[n-1,b]$, $C[n-2,b]$, and $C[n-3,b]$ of the wireless channel of the number indicated by the variable b in the (n−1)th, (n−2)th and (n−3)th scanning operations, respectively, in which the field intensity detection is not performed on this channel, before the n-th scanning operation (step S105).

The control unit 10 adds 4 to the variable b to set a new variable b (step S106), and determines whether or not the variable b is greater than the maximum value of the configurable wireless channels (26 in this example) (step S107).

When the variable b is smaller than or equal to 26 (NO in step S107), the control unit 10 returns to step S102, while, when the variable b is greater than 26 (YES in step S107), the control unit 10 terminates the process.

FIG. 15 is an example field intensity table established in which the fifth estimation process is set in step S64. In the example field intensity table of FIG. 15, the counter value n representing the number of scanning operations is set to 11. In FIG. 15, in the n-th scanning operation, the shaded field intensities are the intensities detected in step S63, and the non-shaded field intensities are the intensities estimated in the fifth estimation process.

Because a detection value of the previous scanning operation is required for the estimation process, when no detection value of the field intensity obtained in the previous scanning operation is available, the estimated value of the field intensity is not calculated and is indicated as "–" in FIG. 15.

Furthermore, in FIG. 15, the field intensity of any wireless channel that is not a detection target channel in a scanning operation (e.g., n=11) is left blank, but it may be set to the latest detected field intensity of the wireless channel.

As indicated in FIG. 15, the field intensity (estimated value) of each wireless channel in an undetected scanning operation is a higher one of the detection values of the field intensities obtained in the preceding and subsequent scanning operations.

For example, as indicated in FIG. 15, when the field intensity of channel 11 is undetected in the first scanning operation but is detected at the 0th and 4th scanning operations, a higher field intensity of the detected field intensity 70 of channel 11 in the 0th scanning operation and the detected field intensity 61 of channel 11 in the 4th scanning operation, which is 70, becomes the estimated value for the field intensities of channel 11 in the first, second and third scanning operations.

As described above, as the estimated value of the field intensity of an undetected channel at a certain scanning operation in the fifth estimation process, a higher one of the field intensity of the channel detected at a scanning operation executed prior to this scanning operation and the field intensity of the channel detected at a scanning operation executed subsequent to the scanning operation is employed.

FIG. 13 is a flowchart of the sixth estimation process.

First, the control unit 10 divides the counter value n representing the number of scanning operations by 4 and sets the remainder (n mod 4) to the variable a, and adds 11 to the variable a and sets the obtained value to the variable b (step S101). The variable b represents the number of a detection target channel that is referred to in the n-th scanning operation.

In accordance with the following equations (5) to (7), the control unit 10 calculates the field intensities C[n−1,b], C[n−2,b] and C[n−3,b] for the wireless channel of the number indicated by the variable b in the (n−1)th, (n−2)th and (n−3)th scanning operations, respectively, in which the field intensity detection is not performed on this channel, prior to the n-th scanning operation (step S112).

$$C[n-3, b] = C[n-4, b] + (C[n, b] - C[n-4, b])/4 \quad (5)$$

$$C[n-2, b] = C[n-4, b] + 2(C[n, b] - C[n-4, b])/4 \quad (6)$$

$$C[n-1, b] = C[n-4, b] + 3(C[n, b] - C[n-4, b])/4 \quad (7)$$

In accordance with the equation (5), the estimated value of the field intensity in the (n−3)th scanning operation is calculated in such a manner that, with respect to a wireless channel of the number indicated by the variable b, the ratio (1:4) of "the difference (=1) between the number of scanning operations (n−3) and the number of scanning operations (n−4) prior to the (n−3)th scanning operation where the field intensity detection is performed on the channel in the (n−4)th scanning" to "the difference (=4) between the number n of scanning operations where the field intensity detection is performed on the channel in the n-th scanning operation and the number (n−4) of scanning operations prior to the n-th scanning where the field intensity detection is performed on the channel in the (n−4)th scanning operation" is equal to the ratio ((C[n−3,b]−C[n−4,b]):(C[n,b]−C[n−4,b])) of "the difference (C[n−3,b]−C[n−4,b]) between the estimated field intensity C[n−3,b] in the (n−3)th scanning operation and the detected field intensity C[n−4,b] in the (n−4)th scanning operation in which the field intensity detection is performed on this channel, prior to the (n−3)th scanning" to "the difference (C[n,b]−C[n−4,b]) between the detected field intensity C[n,b] in the n-th scanning operation in which the field intensity detection is performed on the channel and the detected field intensity C[n−4,b] in the (n−4)th scanning operation in which the field intensity detection is performed on the channel, prior to the n-th scanning".

In accordance with the equation (6), the estimated value of the field intensity in the (n−2)th scanning operation is calculated in such a manner that, with respect to the wireless channel of the number indicated by the variable b, the ratio (2:4) of "the difference (=2) between the number (n−2) of scanning operations and the number (n−4) of scanning operations where the field intensity detection is performed on the channel in the (n−2)th scanning operation prior to the (n−2)th scanning operation" to "the difference (=4) between the number n of scanning operations where the field intensity detection is performed on the channel in the n-th scanning operation and the number (n−4) of scanning operations where the field intensity detection is performed on the channel in the (n−4)th scanning operation prior to the n-th scanning operation" is equal to the ratio ((C[n−2,b]−C[n−4,b]):(C[n,b]−C[n−4,b])) of "the difference (C[n−2,b]−C[n−4,b]) between the estimated field intensity C[n−2,b] in the (n−2)th scanning operation and the detected field intensity C[n−4,b] in the (n−4)th scanning operation in which the field intensity detection is performed on the channel, prior to the (n−2)th scanning" to "the difference (C[n,b]−C[n−4,b]) between the detected field intensity C[n,b] in the n-th scanning operation in which the field intensity detection is performed on the channel and the detected field intensity C[n−4,b] in the (n−4)th scanning operation in which the field intensity detection is performed on the channel, prior to the n-th scanning operation".

In accordance with the equation (7), the estimated value of the field intensity of the (n−1)th scanning is calculated in such a manner that, with respect to the wireless channel of the number indicated by the variable b, the ratio (3:4) of "the difference (=3) between the number (n−1) of scanning operations and the number (n−4) of scanning operations where the field intensity detection is performed on the channel in the (n−4)th scanning operation prior to the (n−1)th scanning operation" to "the difference (=4) between the number n of scanning operations where the field intensity detection is performed on the channel in the n-th scanning operation and the number (n−4) of scanning operations where the field intensity detection is performed on the channel in the (n−4)th scanning operation prior to the n-th scanning operation" is equal to the ratio $((C[n-1,b]-C[n-4,b]):(C[n,b]-C[n-4,b]))$ of "the difference $(C[n-1,b]-C[n-4,b])$ between the estimated field intensity $C[n-1,b]$ in the (n−1)th scanning operation and the detected field intensity $C[n-4,b]$ in the (n−4)th scanning operation in which the field intensity detection is performed on the channel, prior to the (n−1)th scanning" to "the difference $(C[n,b]-C[n-4,b])$ between the detected field intensity $C[n,b]$ in the n-th scanning operation in which the field intensity detection is performed on the channel and the detected field intensity $C[n-4,b]$ in the (n−4)th scanning operation in which the field intensity detection is performed on the channel, prior to the n-th scanning".

The control unit 10 adds 4 to the variable b to set a new variable b (step S113), and determines whether or not the variable b is greater than the maximum number of the configurable wireless channels (26 in this example) (step S114).

When the variable b is smaller than or equal to 26 (NO in step S114), the control unit 10 returns to step S112, while, when the variable b is greater than 26 (YES in step S114), the control unit 10 terminates the process.

FIG. 16 shows an example field intensity table established in step S64 when the sixth estimation process is set. In the example field intensity table of FIG. 16, the counter value n representing the number of scanning operations is 11. In FIG. 16, the shaded field intensities are the intensities detected in step S63 for the n-th scanning operation, while the non-shaded field intensities are the ones estimated in the sixth estimation process.

Because a detection value of the preceding scanning operation is required for the estimation process, if no detection value of the field intensity obtained in the preceding scanning operation is available, the estimated value of the field intensity is not calculated and is indicated by "−" in FIG. 16.

Furthermore, in FIG. 16, the field intensity of any wireless channel that is not a detection target channel in a scanning operation (e.g., n=11) is left blank, but the field intensity of the channel that is not a detection target channel may be set to the latest detected field intensity of this wireless channel.

As illustrated in FIG. 16, the field intensity (estimated value) of a wireless channel in an undetected scanning operation is based on the ratio of the numbers of scanning operations prior to and subsequent to a certain scanning operation where the field intensity detection is performed on the channel and the ratio of differences in the detection values of the field intensities.

As illustrated in FIG. 16, for example, when the counter value n representing the number of scanning operations is 4, the numbers of scanning operations in which the detection is performed on channel 11 that is a detection target channel detected, prior to and subsequent to the scanning operation n=1 in which the detection is not performed on channel 11, are 0 and 4. The difference between the first scanning operation and the 0th scanning is 1 operation, while the difference between the 4th scanning and the 0th scanning is 4 operations. Thus, the ratio of the number of scanning operations at the time of the first scanning operation to the number of scanning operations between the preceding and following scanning operations in which detection is performed on channel 11 is 1:4.

Then, the value for $C[1,11]$ is calculate in such a manner that, with regard to channel 11, the ratio (field intensity difference ratio) of the difference $C[1,11]-C[0,11]$ between the estimated field intensity $C[1,11]$ of the first scanning operation and the detected field intensity $C[0,11]=70$ of the 0th scanning operation to the difference $C[4,11]-C[0,11]$ between the detected field intensity $C[4,11]=61$ of the fourth scanning operation and the detected field intensity $C[0,11]=70$ of the 0th scanning operation is equal to the scan operation number ratio, 1 to 4, and the calculated value (68) becomes the estimated value of the field intensity of channel 11 of the first scanning operation.

In this manner, in the sixth estimation process, the estimated value of the field intensity of a channel that is not detected in a scanning operation is obtained by performing linear interpolation from the two field intensities detected in the two scanning operations in which the field intensity detection is performed on the channel, prior to and subsequent to the undetected scanning operation.

As discussed above, according to the second embodiment, when verifying the communication conditions of multiple wireless channels, several detection target channels selected from the wireless channels are shifted in the frequency direction every time of energy scanning, and the field intensity detection is performed onto these detection target channels only, by the detection unit. By linear interpolation by use of the field intensities of the detection target channels for which the field intensity detection is performed by the detection unit, the estimated values of the field intensities of the remaining undetected channels can be calculated.

For this reason, all the wireless channels are given a chance of having their field intensities detected in several scanning operations, and the estimated values for all the wireless channels are obtained based on the detected field intensities. Hence, the reliability of the field intensities of the wireless channels can be enhanced.

For this reason, the field intensity detection does not have to deal with all the wireless channels in one scanning operation. This reduces the time and power required for the field intensity detection when verifying the communication conditions of multiple wireless channels, and thereby reduces the time and power required for the wireless channel selection process.

According to the above embodiments, the time and power required for the field intensity detection can be reduced when verifying the communication conditions of multiple wireless channels, and the time and power required for the wireless channel selection process can be reduced.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A wireless communication device which performs a wireless communication using a selected one of a plurality of wireless channels obtained by dividing a predetermined frequency band, the device comprising:
an electric field intensity table configured to store newest electric field intensities of the wireless channels;
a detection unit configured to detect electric field intensities of the wireless channels;
a controller configured to (i) select first channels which are selected from among the plurality of wireless channels and of which frequency bands are distributed in frequency bands of the plurality of wireless channels, (ii) detect, by the detection unit, electric field intensities of each of the first channels, (iii) select second channels which are selected from among the plurality of wireless channels and which are different from the first channels, and (iv) estimate electric field intensities of each of the second channels based on the detected electric field intensities of each of the first channels, wherein the controller selects the second channels and estimates the electric field intensities of each of the second channels after having selected the first channels and having detected the electric field intensities of each of the first channels;
an update module configured to update the newest electric field intensities of the plurality of wireless channels stored in the electric field intensity table based on the detected electric field intensities of each of the first channels and the estimated electric field intensities of each of the second channels; and
a channel changing unit configured to determine whether or not a communication state of a use channel which is a wireless channel currently used for transmission/reception deteriorates, to read the newest electric field intensities of the wireless channels updated and stored in the electric field intensity table when deterioration is determined, and to change the use channel based on the read electric field intensities.

2. The wireless communication device according to claim 1, wherein the channel changing unit is configured to determine whether or not the communication state of the use channel deteriorates after a data transmission or a data reception at the use channel.

3. The wireless communication device according to claim 1, wherein the channel changing unit is configured to determine whether or not the communication state of the use channel deteriorates based on an electric field intensity of the use channel which is determined by referring to the electric field intensities of the wireless channels stored in the electric field intensity table.

4. The wireless communication device according to claim 3, wherein the channel changing unit is configured to determine whether or not the communication state of the use channel deteriorates based on an error rate or reception rate for actual transmission or reception at the use channel when deterioration of the communication state is not detected by referring to the electric field intensity table.

5. The wireless communication device according to claim 1, wherein the controller is configured to calculate, for each second channel, an average value of the electric field intensities of predetermined wireless channels above and below the second channel, and to set the average value as an estimated value of the electric field intensity of the second channel.

6. The wireless communication device according to claim 1, wherein the controller is configured to calculate, for each second channel, a higher one of the electric field intensities of predetermined wireless channels above and below the second channel, and to set the higher one of the electric field intensities as an estimated value of the electric field intensity of the second channel.

7. The wireless communication device according to claim 1, wherein the controller is configured to calculate, for each second channel, the electric field intensity of the second channel such that a first ratio and a second ratio are equal to each other, the first ratio being a ratio of a number of wireless channel intervals between the second wireless channel and a first predetermined wireless channel below the second wireless channel to a number of wireless channel intervals between second predetermined wireless channels above and below the second wireless channel, and the second ratio being a ratio of a difference between the electric field intensity of the second wireless channel and the electric field intensity of the first predetermined wireless channel below the second wireless channel to a difference between the electric field intensities of the second predetermined wireless channels above and below the second wireless channel.

8. A non-transitory computer-readable storage medium having a program stored thereon which controls a computer in a wireless communication device that performs a wireless communication using a selected one of a plurality of wireless channels obtained by dividing a predetermined frequency band, the program controlling the computer to function as units comprising:
an electric field intensity table configured to store newest electric field intensities of the wireless channels;
a detection unit configured to detect electric field intensities of the wireless channels;
a controller configured to (i) select first channels which are selected from among the plurality of wireless channels and of which frequency bands are distributed in frequency bands of the plurality of wireless channels, (ii) detect, by the detection unit, electric field intensities of each of the first channels, (iii) select second channels which are selected from among the plurality of wireless channels and which are different from the first channels, and (iv) estimate electric field intensities of each of the second channels based on the detected electric field intensities of each of the first channels, wherein the controller selects the second channels and estimates the electric field intensities of each of the second channels after having selected the first channels and having detected the electric field intensities of each of the first channels;
an update module configured to update the newest electric field intensities of the plurality of wireless channels stored in the electric field intensity table based on the detected electric field intensities of each of the first channels and the estimated electric field intensities of each of the second channels; and
a channel changing unit configured to determine whether or not a communication state of a use channel which is a wireless channel currently used for transmission/reception deteriorates, to read the newest electric field intensities of the wireless channels updated and stored in the electric field intensity table when deterioration is determined, and to change the use channel based on the read electric field intensities.

* * * * *